United States Patent
Orenstien et al.

(10) Patent No.: US 7,159,133 B2
(45) Date of Patent: *Jan. 2, 2007

(54) LOW-POWER PROCESSOR HINT, SUCH AS FROM A PAUSE INSTRUCTION

(75) Inventors: Doron Orenstien, Haifa (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 10/759,455

(22) Filed: Jan. 16, 2004

(65) Prior Publication Data

US 2004/0148534 A1 Jul. 29, 2004

Related U.S. Application Data

(63) Continuation of application No. 09/733,821, filed on Dec. 7, 2000, now Pat. No. 6,687,838.

(51) Int. Cl.
G06F 1/32 (2006.01)

(52) U.S. Cl. ..................................... 713/320
(58) Field of Classification Search ............. None
See application file for complete search history.

(56) References Cited

U.S. PATENT DOCUMENTS

| 5,892,959 | A | 4/1999 | Fung |
| 6,079,025 | A | 6/2000 | Fung |
| 6,105,142 | A | 8/2000 | Goff et al. |
| 6,128,745 | A | 10/2000 | Anderson et al. |
| 6,308,279 | B1 | 10/2001 | Toll et al. |
| 6,687,838 | B1 * | 2/2004 | Orenstien et al. ........... 713/320 |

* cited by examiner

Primary Examiner—Lynne H. Browne
Assistant Examiner—Anand B. Patel
(74) Attorney, Agent, or Firm—Blakely, Sokoloff, Taylor & Zafman LLP

(57) ABSTRACT

A system and corresponding method use a PAUSE instruction as a low power hint in a single threaded or multi-threaded environment using "processor slow mode." One embodiment actually lowers the frequency of the processor clock. Another embodiment virtually lowers the frequency of the processor clock by gating M clock cycles out of every N clock cycles. When all threads have issued a PAUSE instruction, the processor enters slow mode and remains there for a while. After this while, the processor returns to normal mode. Alternatively, an event, such as an interrupt or an exception, can cause the processor to return to normal mode from slow mode.

30 Claims, 4 Drawing Sheets

LOW-POWER PROCESSOR HINT, SUCH AS FROM A PAUSE INSTRUCTION

CROSS-REFERENCE TO RELATED APPLICATIONS

This application is a Continuation of U.S. application Ser. No. 09/733,821, filed Dec. 7, 2000 now U.S. Pat. No. 6,687,838.

BACKGROUND OF THE INVENTION

1. Field of the Invention

The invention is related to computers and computer technology, and in particular, to computer instructions.

2. Background Information

A "process" typically has control over computer resources such as files, input/output (I/O) devices, etc. A process may be referred to sometimes as a "task." A computer "program" is a series of step-by-step "instructions" to tell a computer what to do), usually stored in computer memory. A computer "processor" executes the instructions specified in the program. The processor reads (or fetches) instructions from memory one at a time and executes each instruction. Program execution consists of repeating the process of instruction fetch and instruction execution. An "instruction cycle" refers to the steps required for a single instruction, which is instruction fetch and instruction execution.

Operating systems can support one or more threads. As used herein a "thread" refers to a sequence of instructions that can run independently for a while and, in this context, a thread may be referred to as a "process."

A single threaded operating system is an operating system that can run one thread only (or the operating system does not recognize the concept of a threads). Single threaded operating systems are well known (e.g., Microsoft DOS).

A multithreaded operating system is an operating system that can execute two or more threads in parallel. An example of a multithreaded operating system is Windows NT® operating system available from Microsoft® Corporation of Redmond, Wash. In a multithreaded operating system, the user sees several threads running in parallel. However, the number of actually running threads at each cycle depends on the number of logical processors that constitutes the system.

The number of logical processors depends on the number of real processors in the system and on the number of logical processors in each real processor. A multithreaded processor can viewed as one more or more logical processors.

A single threaded processor is a processor that can maintain only one running thread at a certain execution cycle. Single threaded processors are well known.

A multithreaded processor is a processor that is theoretically divided into two or more logical processors. One logical processor executes instructions from one thread and other logical processors execute instructions from other threads. An example multithreaded processor is an EV8 (Alpha Processor 21464) promised from Compaq Computer Corporation in Houston, Tex., which also may be referred to as a simultaneous multithreaded (SMT) processor. In SMT, the processor can run more than one thread simultaneously. SMT therefore can issue and execute multiple instructions from multiple threads each instruction cycle. A multi-threaded operating system can operate on a single threaded processor, a multi processor system, or a simultaneous multithreaded processor.

A processor may slow down a process from time to time if the process about to be executed is not important from a performance perspective. This may be the case with so-called "busy loops" typical of idle tasks, which tend to disproportionately and undesirably consume computer resources by performing a particular task repeatedly and aggressively.

One way a process can signal a processor to slow itself down is for the process to issue a PAUSE instruction. The PAUSE instruction allows a process to tell the processor that the process has a lower priority than other processes. The PAUSE instruction temporarily suspends the process such that the processor can allocate more resources to processes that are more important. The PAUSE instruction delays execution of the next instructions for a period of time. As a result, the processor can allocate more resources to processes that are not idle. The processor can thereby execute those processes faster because there is less competition for computer resources. Originally, the PAUSE instruction is intended to slow down low-priority processes running on SMT processors.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
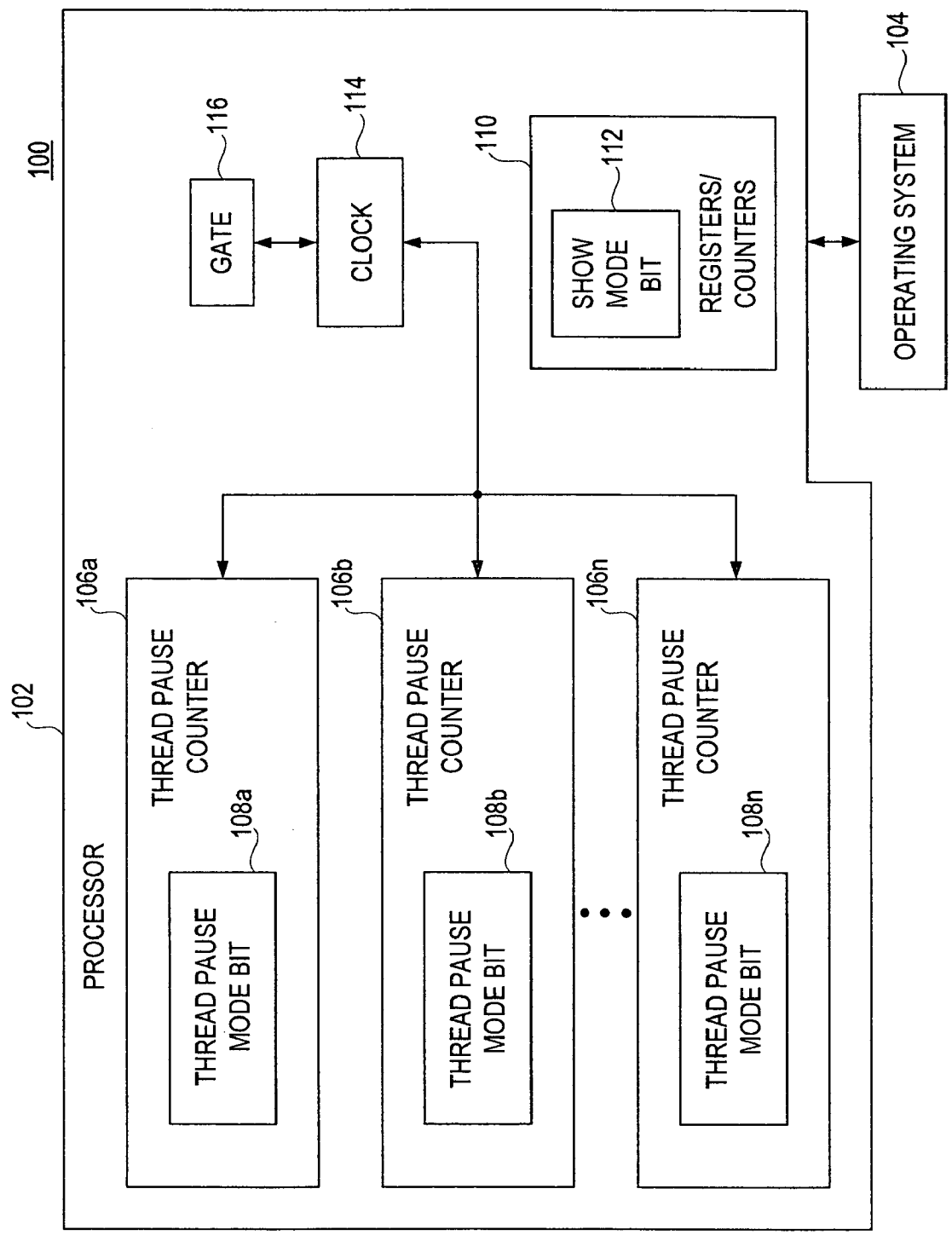
FIG. 1 is a block diagram of a processing environment suitable for implementing an embodiment of the invention.

A system and corresponding methods to use a PAUSE instruction as a low power hint in a single threaded or multithreaded environment using a "processor slow mode" are described in detail herein. In the following description, numerous specific details are provided, such as particular processes, operating systems, counters, registers, etc. to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Some parts of the description will be presented using terms such as program, register, counter, processor, and so forth, commonly employed by those skilled in the art to convey the substance of their work to others skilled in the art. Other parts of the description will be presented in terms of operations performed by a computer system, using terms such as accessing, determining, counting, transmitting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Reference throughout this specification to "one embodiment" or "an embodiment" means that a particular feature, structure, process, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

An aspect of the present invention uses the semantics of a PAUSE instruction as a low power hint for a processor. The processor can be a single threaded processor or a (simultaneous) multithreaded processor. The operating system can be a single threaded operating system or a (simultaneous) multithreaded operating system.

In general, when all threads have issued a PAUSE instruction, then the processor slows down. A "thread" is an execution path through one or more programs. Execution may be interleaved with other threads. A thread may also be referred to as a "lightweight process." Typically, each thread has an "execution state" or "execution mode." For example, each thread may have a "thread pause mode" or "thread normal mode." In "thread pause mode," the thread has issued a PAUSE instruction; the thread has not yet returned to "thread normal mode." In "thread normal mode," the thread has not issued a PAUSE instruction.

After a predetermined time period has elapsed, the processor moves from processor slow mode to processor normal mode. Alternatively, when a particular event occurs, the processor moves from processor slow mode to processor normal mode.

FIG. 1 is a block diagram of a computer system 100 suitable for implementing aspects of the present invention. The computer system 100 includes a processor 102. The processor 102 is intended to represent a broad range of well-known computers of any number of forms, desktop, laptop, hand-held, and the like, equipped with the proper communication or networking equipment, as well as software.

The processor 102 may run in "processor slow mode" or "processor normal mode." For example, in "processor slow mode," the processor 102 may run at one frequency. In "processor normal mode," the processor 102 may run at a different frequency. In an embodiment, the frequency of the processor 102 in processor normal mode is higher than the frequency of the processor 102 in processor slow mode. The processor consumes less power at the lower frequency than at the higher frequency.

Alternatively, in "processor slow mode," the processor 102 may operate at one voltage. In "processor normal mode," the processor 102 may operate at a different voltage. In an embodiment, the voltage of the processor 102 in processor normal mode is higher than the voltage of the processor 102 in processor slow mode. The processor consumes less power at the lower voltage than at the higher voltage.

The processor 102 can be a single threaded processor. In this embodiment, the PAUSE instruction from a single thread instructs the processor 102 to enter processor slow mode for a predetermined time period. When the predetermined time period elapses (or the thread times out), the processor 102 returns to processor normal mode.

The processor 102 also may enter processor slow mode and remain there until a particular event occurs. An event can be an external interrupt, an exception, etc. In general, an interrupt is generated by a signal from hardware and may occur at random times during the execution of a program. An interrupt may be generated by a condition that occurs as a result of an instruction execution, generated by a timer within the processor 102, generated by an external device controller, generated by a failure, etc. In general, an exception is generated from software, and is provoked by the execution of an instruction. An exception may result, for example, when the processor 102 encounters an error while attempting to execute an instruction or may be generated by the instruction itself. When the particular event occurs, the processor 102 returns to processor normal mode.

The processor 102 can be a (simultaneous) multithreaded processor. On any given cycle the processor 102 can execute M instructions from N different threads. When all threads have issued a PAUSE instruction, the PAUSE instructions are ANDed together to instruct the processor 102 to enter processor slow mode for a predetermined time period. As such, the PAUSE instruction is a low power hint. When the predetermined time period elapses, the processor 102 returns to processor normal mode. The processor 102 also may enter processor slow mode and remain there until a particular event occurs. When the particular event occurs, the processor 102 returns to processor normal mode.

The computer system 100 includes an operating system 104, which performs its conventional functions of managing the allocation and de-allocation of resources within the computer system 100 during execution of programs. In so doing, the operating system 104 programs registers, reads counters, resets counters, etc.

The processor 102 includes several software readable thread pause counters (106) associated with several threads, as represented by, such as illustrated thread pause counters 106a, 106b, . . . and 106n. In an embodiment, each thread pause counter 106 indicates how long its associated thread remains in thread pause mode before it returns to thread normal mode. This correlates to how long the processor 102 remains in processor slow mode before returning to processor normal mode.

Each thread pause counter 106 includes a software readable thread pause mode bit, such as illustrated thread pause mode bits 108a, 108b . . . , and 108n, corresponding to each thread pause counter 106a, 106b . . . , and 106n, respectively. In an embodiment, each thread pause mode bit 108 reflects whether the associated thread pause counter 106 has a special value to indicate whether the thread is in thread pause mode. The special value may be "zero."

The processor 102 also includes a set of software readable registers/counters 110 that has a register portion and a counter portion. The register portion includes registers, which are storage devices that have a specified storage capacity, such as a bit, a byte, or a computer word. Register and counter technology are well known. In one embodiment, one register stores a global processor slow mode bit 112. The slow mode bit indicates the status of the entire processor 102. The counter portion includes well-known counters, such as program counters, and the like.

The processor 102 includes a clock 114, which performs its usual functions of determining the speed or frequency of the processor 102. Recall that when all threads have issued a PAUSE instruction, the processor 102 slows down. Mechanisms to slow down the processor 102 are orthogonal to using the PAUSE instruction as a low power hint in a single threaded or multithreaded environment using "processor slow mode." In one embodiment, the processor 102 is slowed down by virtually lowering the clock 114 frequency. This can be accomplished by fully gating the clock 114 with a well-known gate 116 for M clocks every N clocks (M<N). This mechanism reduces the processor 102's frequency by a predefined factor. In another embodiment, the processor 102 is slowed down by actually lowering the clock 114 frequency. Of course, persons of ordinary skill will readily recognize various other ways to slow down the processor 102. Moreover, actually or virtually reducing the clock 114 frequency can be combined with actually or virtually reducing the operating voltage of the processor 102 or with other mechanisms to slow down the processor 102.

In one embodiment, the processor 102 slows down (or enters processor slow mode) for a predetermined time period. The predetermined time period can be long enough for a busy loop consisting of PAUSE instructions to stay in processor slow mode and not return to processor normal mode between two consecutive PAUSE instructions. In this embodiment, the predetermined time period is set by loading each thread pause counter 106 with a value equivalent to the time required for a busy loop consisting of PAUSE instructions to stay in processor slow mode and not return to processor normal mode between two consecutive PAUSE instructions. Of course, the present invention is not limited by how long each thread remains in thread pause mode or the processor 102 remains in processor slow mode, and persons of ordinary skill will readily recognize various other ways to determine and set the predetermined time period.

In another embodiment, the processor 102 enters processor slow mode and remains there until an event occurs. If before the event, the processor 102 was in processor slow mode, when the event occurs, the processor 102 returns to processor normal mode.

Figure 2:
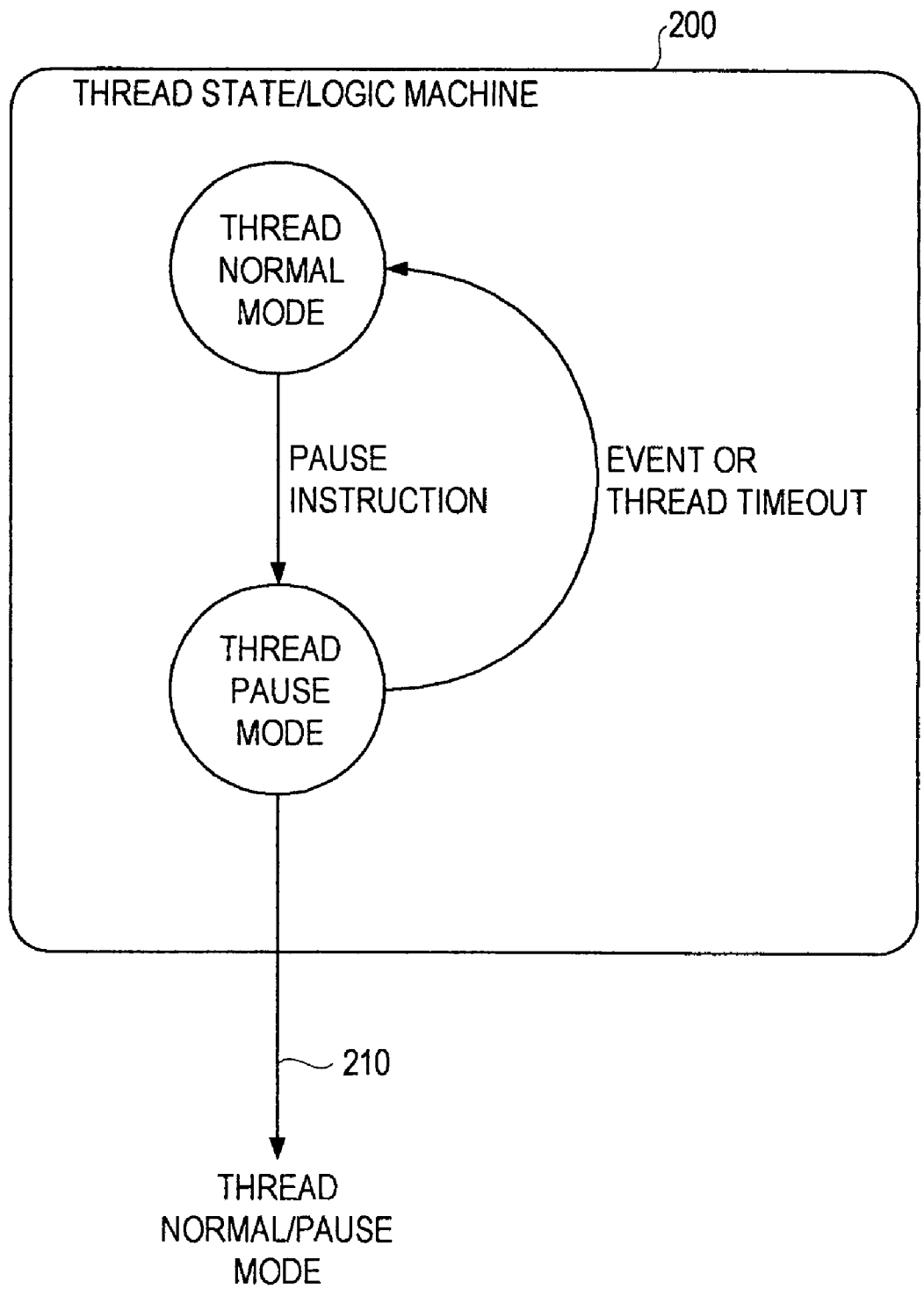
FIG. 2 depicts an exemplar logic/state machine for a thread.

FIG. 2 shows a thread/state logic machine 200. The thread/state logic machine 200 issues a thread normal/pause mode signal 210 to indicate whether the thread/state logic machine 200 is in thread normal mode or thread pause mode. Each thread has a corresponding thread/state logic machine 200.

Figure 3:
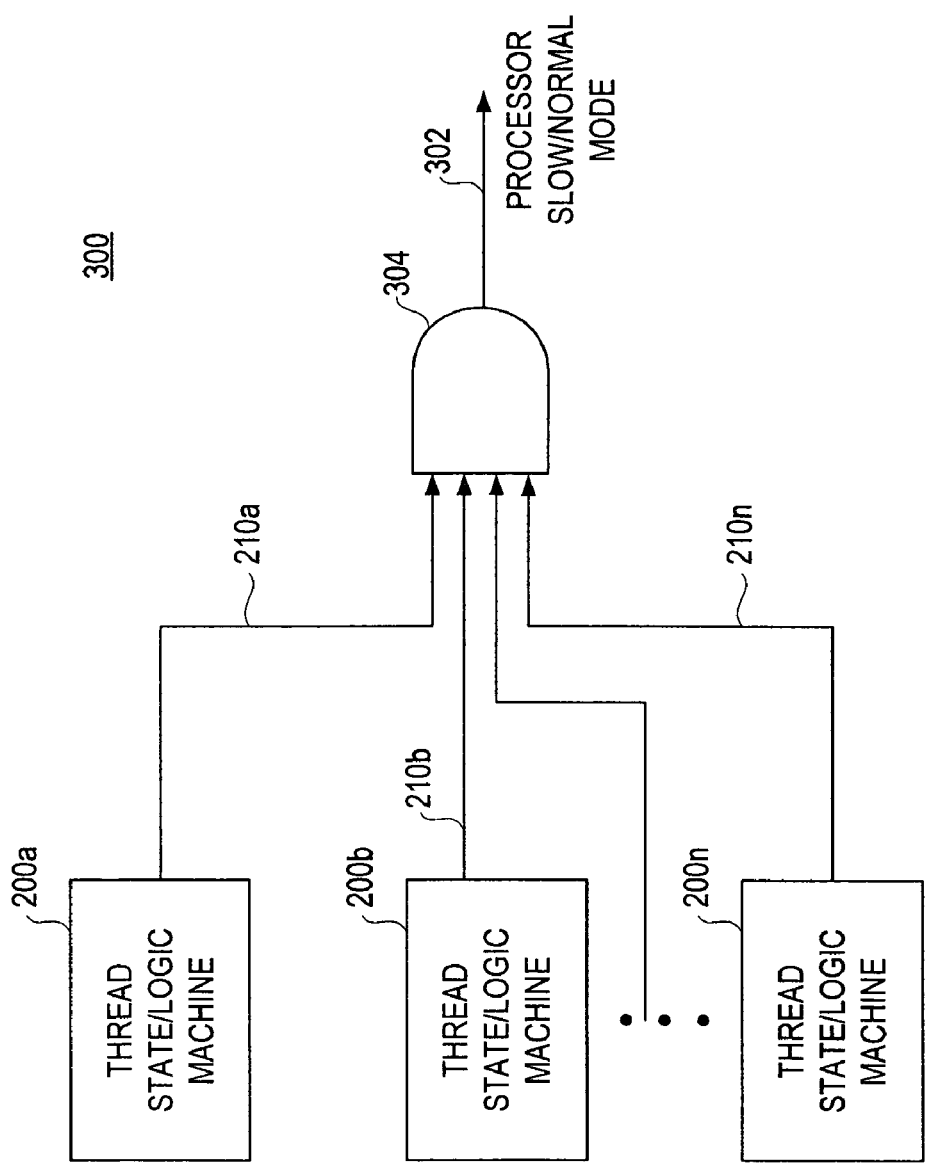
FIG. 3 depicts exemplar decision logic.

FIG. 3 shows decision logic 300 that ANDs several thread normal/pause mode signals 210, as represented by the thread/state logic machines 210a, 210b, . . . , and 210n, from several thread/state logic machine 200, as represented by the thread/state logic machines 200a, 200b, . . . , and 200n, into a single processor slow mode signal 302 using an AND gate 304.

Figure 4:
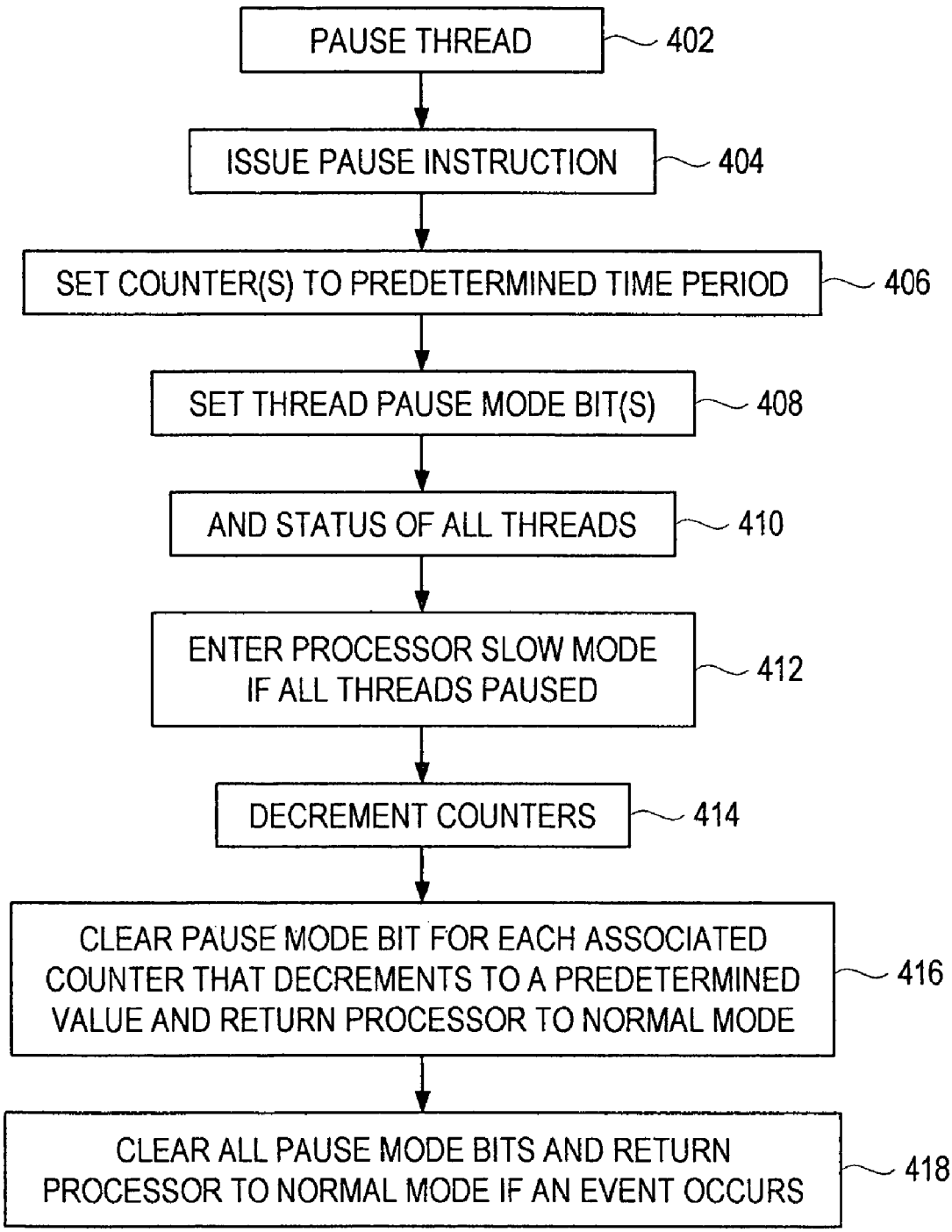
FIG. 4 is a flowchart illustrating operation of one embodiment of the present invention.

FIG. 4 describes a method 400 of operating an embodiment of the present invention. When a thread pauses (402) and issues a PAUSE instruction (404), the following occurs. The associated thread pause counter 106a, 106b . . . , and/or 106n is set to a value equivalent to the predetermined time duration (406) and the associated thread pause mode bit 108a, 108b . . . , and/or 108n is set to a logic level (408). The status of all threads is ANDed (410).

In one embodiment, the slow mode bit 112 is set to a logic level that is the AND value of the logic levels to which all thread pause mode bits 108a, 108b . . . , and/or 108n are set. If the slow mode bit 112 is set to a logic level indicating that all threads are in thread pause mode, the processor 102 enters processor slow mode (412).

Each cycle of the clock 114 all thread pause counters 106 are decremented (414). If any of the thread pause counters 106 counts down to zero, which indicates that the predetermined time period has elapsed, the relevant thread pause mode bit 108a, 108b . . . , and/or 108n is cleared (416) and the processor 102 returns to processor normal mode. If an event occurs, all thread pause mode bits 108a, 108b . . . , and 108n are cleared and the processor 102 returns to processor normal mode (418).

According to another embodiment, assume that there are only two threads, one thread displays a menu and reads user inputs. This thread is associated with the thread pause counter 106a and the thread/state logic machine 200a. The other thread executes user commands. This thread is associated with the thread pause counter 106b and the thread/state logic machine 200b. Assume further that the thread associated with the thread pause counter 106a issues a PAUSE instruction and the thread associated with the thread pause counter 106b does not.

In this case, thread pause counter 106a is set to the predetermined time period and the thread pause mode bit 108a is set to indicate that the thread is in thread pause mode, but the processor 102 remains in processor normal mode because the slow mode bit 112 indicates that the thread associated with the thread/state logic machine 200b is not in thread pause mode. This is because the AND 304 sees on its inputs that the thread/state logic machine 200a and the thread/state logic machine 200b are set to different logic levels.

The thread pause counter 106a decrements each clock of the clock 114. If during decrementing the thread pause counter 106b is set to the predetermined time duration and the thread pause mode bit 108b is set to indicate that the associated thread is in thread pause mode, then the processor 102 changes to processor slow mode because the slow mode bit 112 indicates that all threads, i.e., the thread associated with the thread pause counter 106a and the thread/state logic machine 200a as well as thread associated with the thread pause counter 106a and the thread/state logic machine 200a, are in thread pause mode.

If the thread pause counters 106 are updated (or decremented) each cycle of the clock 114 corresponding to the frequency of the processor normal mode, the count down of the thread pause counters 106 continues at the same pace whether the processor 102 is in processor slow mode or processor normal mode. An alternative embodiment uses the clock 114 at the processor slow mode frequency to decrement the thread pause counters. According to this embodiment, the thread pause counters 106 are decremented by non-unit values after the clock 114 is gated by the gate 116 and are treated as saturated counters.

Using the PAUSE instruction as a low power hint is useful in many applications. For example, word processing applications spend a lot of time in idle mode waiting for an input from the keyboard, the mouse, etc. Using the PAUSE instruction as a low power hint enables the processor 102 to switch to processor slow mode during these waiting periods. This saves power even if the processor 102 remains in processor slow mode only for short periods of time.

In some cases, it may be desirable to transfer the processor 102 to an even more aggressive power saving mode. For example, when the processor 102 has been waiting for keyboard input for a long time it may be wise to slow down the processor 102 more. According to one embodiment, a software readable counter in the counter portion of the registers/counters 106 records the length of the current/last period in which the processor 102 is/was in processor slow mode. The counter is incremented every cycle the processor 102 is in processor slow mode. The operating system 104 can read the counter and can reset it. Occasionally, the operating system 104 reads the counter and, if the counter reaches a certain value, the processor 102 moves into a more aggressive power saving mode. For example, the frequency of the processor 102 decreases even more than when in processor slow mode. Certain events can cause the operating system 104 to reset the counter. More optimized but also more complex schemes are possible, e.g., the counter is cleared if the processor 102 is not in processor slow mode for some time, etc.

Aspects of the invention can be implemented using hardware, software, or a combination of hardware and software. Such implementations include state machines and application specific integrated circuits (ASICs). In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   determining that each thread running on a processor has issued a pause instruction; and
   reducing power consumption in response to the determination that each thread running on the processor has issued a pause instruction.

2. The method of claim 1, further comprising reducing the frequency of the processor.

3. The method of claim 1, further comprising gating M clock cycles out of every N clock cycles of a processor clock.

4. The method of claim 1, further comprising increasing power consumption after a predetermined time period has elapsed or when an event occurs.

5. The method of claim 1, further comprising lowering processor voltage.

6. The method of claim 1, further comprising running only one thread on the processor.

7. The method of claim 1, further comprising slowing down the processor.

8. A method, comprising:
   determining that each thread running on a processor has issued a pause instruction; and
   leave a normal mode of operation and entering into a slow mode of operation in response to the determination that each thread running on the processor has issued a pause instruction.

9. The method of claim 8, further comprising reducing processor frequency.

10. The method of claim 8, further comprising gating M clock cycles out of every N clock cycles of a processor clock.

11. The method of claim 8, further comprising returning to the normal mode of operation after a predetermined time period has elapsed.

12. The method of claim 8, further comprising returning to the normal mode of operation when an event occurs.

13. The method of claim 8, further comprising running only one thread on the processor.

14. The method of claim 8, further comprising lowering processor voltage.

15. The method of claim 8, further comprising loading counters associated with the threads with a value to indicate how long the associated thread is to remain paused.

16. The method of claim 8, further comprising leaving the slow mode of operation and entering a slower mode of operation in response to a determination that the processor has been in the slow mode for a predetermined time period.

17. A method, comprising:
   receiving a pause instruction from each thread running on a processor; and
   hinting the processor to enter a low power mode in response to receiving the pause instruction from each thread running on the processor.

18. The method of claim 17, further comprising hinting the processor to remain in the low power mode for a predetermined time period.

19. The method of claim 17, further comprising hinting the processor to remain in the low power mode until an event occurs.

20. The method of claim 17, further comprising hinting the processor to enter a lower power mode after a predetermined time period elapses.

21. The method of claim 17, further comprising reducing a processor clock frequency.

22. The method of claim 17, further comprising lowering a processor voltage.

23. The method of claim 17, further comprising gating M clock cycles out of every N clock cycles of a processor clock.

24. An article of manufacture including a machine-accessible medium having data that, when accessed by a machine, cause the machine to perform the operations comprising:
   receiving a pause instruction from each thread running on a processor; and
   hinting the processor to enter a low power mode in response to receiving the pause instruction from each thread running on the processor.

25. The article of manufacture of claim 24, wherein the machine-accessible medium further includes data that cause the machine to perform operations comprising hinting the processor to remain in the low power mode for a predetermined time period.

26. The article of manufacture of claim 24, wherein the machine-accessible medium further includes data that cause the machine to perform operations comprising hinting the processor to remain in the low power mode until an event occurs.

27. The article of manufacture of claim 24, wherein the machine-accessible medium further includes data that cause the machine to perform operations comprising hinting the processor to enter a lower power mode after a predetermined time period elapses.

28. The article of manufacture of claim 24, wherein the machine-accessible medium further includes data that cause the machine to perform operations comprising reducing a processor clock frequency.

29. The article of manufacture of claim 24, wherein the machine-accessible medium further includes data that cause the machine to perform operations comprising lowering a processor voltage.

30. The article of manufacture of claim 24, wherein the machine-accessible medium further includes data that cause the machine to perform operations comprising gating M clock cycles out of every N clock cycles of a processor clock.

\* \* \* \* \*